United States Patent
Zahavi

Patent Number: 5,592,563
Date of Patent: Jan. 7, 1997

[54] IMAGING OF 3-DIMENSIONAL OBJECTS

[76] Inventor: Dov Zahavi, 12 Eilat Street, Haifa, Israel

[21] Appl. No.: 457,750

[22] Filed: Jun. 1, 1995

Related U.S. Application Data

[63] Continuation of Ser. No. 17,858, Feb. 16, 1993, abandoned.

[51] Int. Cl.[6] ..................................... G06K 9/40
[52] U.S. Cl. ..................... 382/154; 382/312; 382/255; 382/284
[58] Field of Search ..................... 382/154, 255, 382/312, 318, 319, 323, 285, 284; 348/222, 343, 345, 42

[56] References Cited

U.S. PATENT DOCUMENTS

| | | | |
|---|---|---|---|
| 4,584,704 | 4/1986 | Ferren | 382/65 |
| 4,661,986 | 4/1987 | Adelson | 382/41 |
| 4,908,573 | 3/1990 | Kaufman et al. | 382/41 |
| 5,003,166 | 3/1991 | Girod | 382/255 |
| 5,046,117 | 9/1991 | Yamashita | 382/47 |
| 5,148,502 | 9/1992 | Tsujiuchi et al. | 382/280 |

*Primary Examiner*—Jose L. Couso
*Assistant Examiner*—D. Richard Anderson, Jr.
*Attorney, Agent, or Firm*—Notaro & Michalos P.C.

[57] ABSTRACT

There is provided a device and a method for the formation of a high-resolution image of a 3-dimensional object. The surface of the object is scanned stepwise by a linear detector matrix, so that the entire height of the object is covered. The arrangement is such that each horizontal "slice" is in focus, for the specific altitude of the "slice", and the information is fed to an image selector which evaluates the video images, selecting the "in focus" information, and using this for the construction of the image. The system is based on a plurality of linear CCD detector arrays, which are used for scanning the surface of the object, the image selections mechanism and the mechanism for thus constructing the desired image.

7 Claims, 8 Drawing Sheets

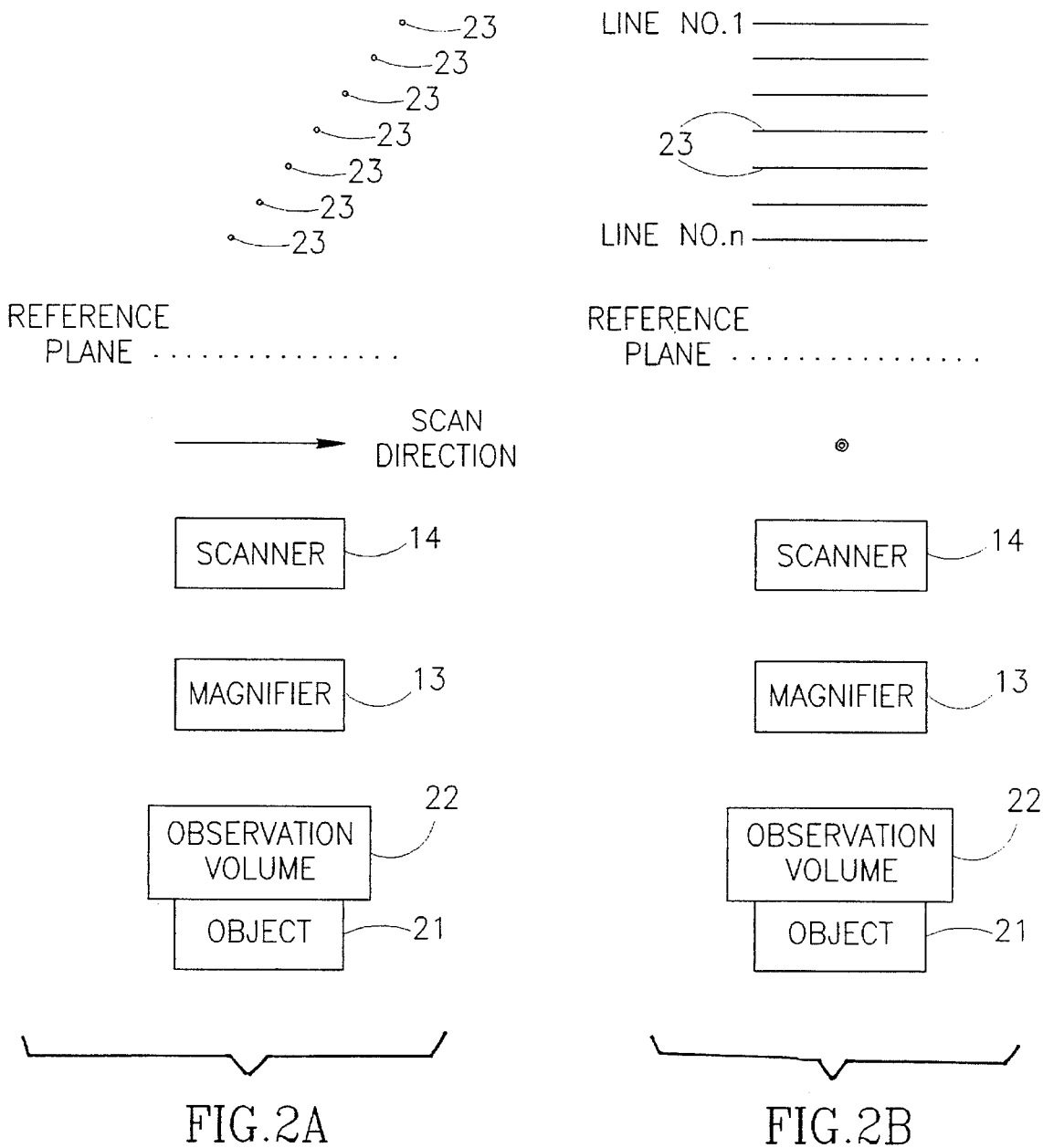

IMAGING OF 3-DIMENSIONAL OBJECTS

This application is a continuation of application Ser. No. 08/017,858, filed Feb. 16, 1993, now abandoned.

FIELD OF THE INVENTION

A device and method for forming a high resolution image of a three dimensional object. The object is scanned so as to cover its entire volume, the scan being performed by means of linearly arranged arrays of photosensitive elements, covering a narrow rectangular segment, the image of consecutive rectangles being evaluated so as to provide the required high resolution image. The basic elements of the device are optical means for forming an image of the 3-dimensional object, scanning and detection means, an image selector and a video output.

BACKGROUND OF THE INVENTION

The imaging of three-dimensional objects so as to obtain high-resolution results is rather difficult. If conventional optical means are used, the image obtained at any instant is in focus only at or near the focal plane of such optical means.

It is known to scan the height of the object, relative the optical instrument, a number of times, resulting in a plurality of images, where only a part of each image is in focus, and where in each such individual image this part delineates a different level of the object or of the height contour of the object.

Another approach is the use of confocal clevis, where the illumination is also focussed at the same height where the image is taken, and thus most not-in-focus information is rejected. In order to obtain the image of the entire object, the entire height must be scanned, which puts severe limits on the type of illumination which can be used. Still another method involves the use of a scanning electron microscope (SEM) which requires cumbersome preparation of most objects and expensive equipment.

With laser profile measurements all non-dimensional information, such as texture, color etc., is lost.

The present invention overcomes to a large extent shortcomings of existing devices and methods of imaging.

The novel system is suitable to reconstruct the image of non planar objects which will not be limited in these ways.

SUMMARY OF THE INVENTION

The invention relates to a device and to a method for forming a high resolution image of a three-dimensional object, The object is scanned so as to obtain defined sectional images, covering the entire surface of the object, by means of a linear array of photosensitive elements, the evaluation of consecutive images, at slightly different levels being evaluated, taking into consideration the time lag between such images, to reconstruct an image of the entire object.

More particularly the present invention relates to a method for forming a high-resolution image of a non-planar object which comprises forming an image of the object by an optical system, scanning the object in a stepwise manner by a linear detector matrix so that the entire height of the image is covered, each image "slice" being in focus for the imaged altitude, feeding the in-focus information to an image selector, which evaluates the video images taking into consideration the time delay between consecutive "slices", selecting the "in focus" information and by summing up the entire information created by the scan, creating the desired image.

The invention further relates to a system for forming a high-resolution image of a non-planar object which comprises optical means for forming an image of the entire object to be imaged, a detector matrix comprising a plurality of lines of CCD detectors, means for scanning the entire volume of the object in a stepwise manner, each step covering a slice defining a certain altitude so that the sum of these covers the entire surface of the object, an image selector for selecting the images containing a maximum of in-focus information by comparing adjacent slices, and means for thus creating the desired 3-dimensional image.

The principle features are described in the following.

The invention is illustrated with reference to a system wherein a comparatively small object is used in order to obtain an enlarged image thereof. It is of course a matter of choice, and depends also on the size of the object, whether such an enlargement is required or not. Let us define a volume in which the objects (or parts of the objects) will be enclosed. This will be the "Observation Volume.

This volume is imaged by the optical device and thus an Image Volume is created (in which an image of the object is enclosed).

A detector matrix is moved in such a way that each row of linear detector sweeps over the entire Image Volume each at a different level. This can be done either by actually moving the matrix or by a change in the optical device that will move the Image Volume across the detector matrix.

If the matrix consists on N detector lines, N images of the Image Volume are generated by these N lines.

Each image is focussed to a certain height of the Image Volume and thus, contains in-focus video information of objects in an "Altitude Slice" of this volume. (The detector matrix is constructed in such a way that the N altitude slices contain the entire Image Volume). Each image also contains out-of-focus information about the other "slices". As the video information is generated it is processed and a combined image is created, consisting of pieces of in-focus video information contained in the N images.

The invention will be illustrated with reference to a certain defined volume, in which the three-dimensional object which is to be imaged, is confined. There is provided a matrix of detectors, which sweep over an image of the object created by optical means (lens or lens system). This is done by the relative movement of matrix versus image, or change in parameters of the optics, or by movement of the object. If a horizontal linear array of sensors (such as photosensitive elements) is used to scan the object so that each scan provides an image of the narrow rectangular horizontal section of the surface of the object, at that given level, and if such scans are repeated so as to consecutively cover the entire surface, it is possible by suitable means, such as an image selector, and by retaining only those portions of each image which are in focus, to obtain a high-resolution image. The array or arrays will be oriented at a certain angle respective the horizontal plane. It is possible to use one such array, and it is also possible to use a plurality of horizontal linear arrays to effect such scans, We will term in the following each such narrow rectangle as "scan line". If the entire matrix consists of N detector lines, N images are generated of the Image Volume. Each of the images is focused at a certain level (height) of the image volume, and thus contains infocus information of that part of the object located in that "level slice" of the volume. Each of the images also contains out of focus information about other "slices", and also out-of-focus information about any part of the "slice" at the given level which is not in focus. Images of consecutive "slices" are compared, adjusting for the time lag of consecutive images, when a single linear array is used for repeated scans, and such images are evaluated and processed to result in a combined image of the entire object.

BRIEF DESCRIPTION OF THE DRAWINGS

The invention is illustrated with reference to the enclosed schematical Figures, which are not according to scale, and in which.

DESCRIPTION OF THE PREFERRED EMBODIMENT

Figure 1:
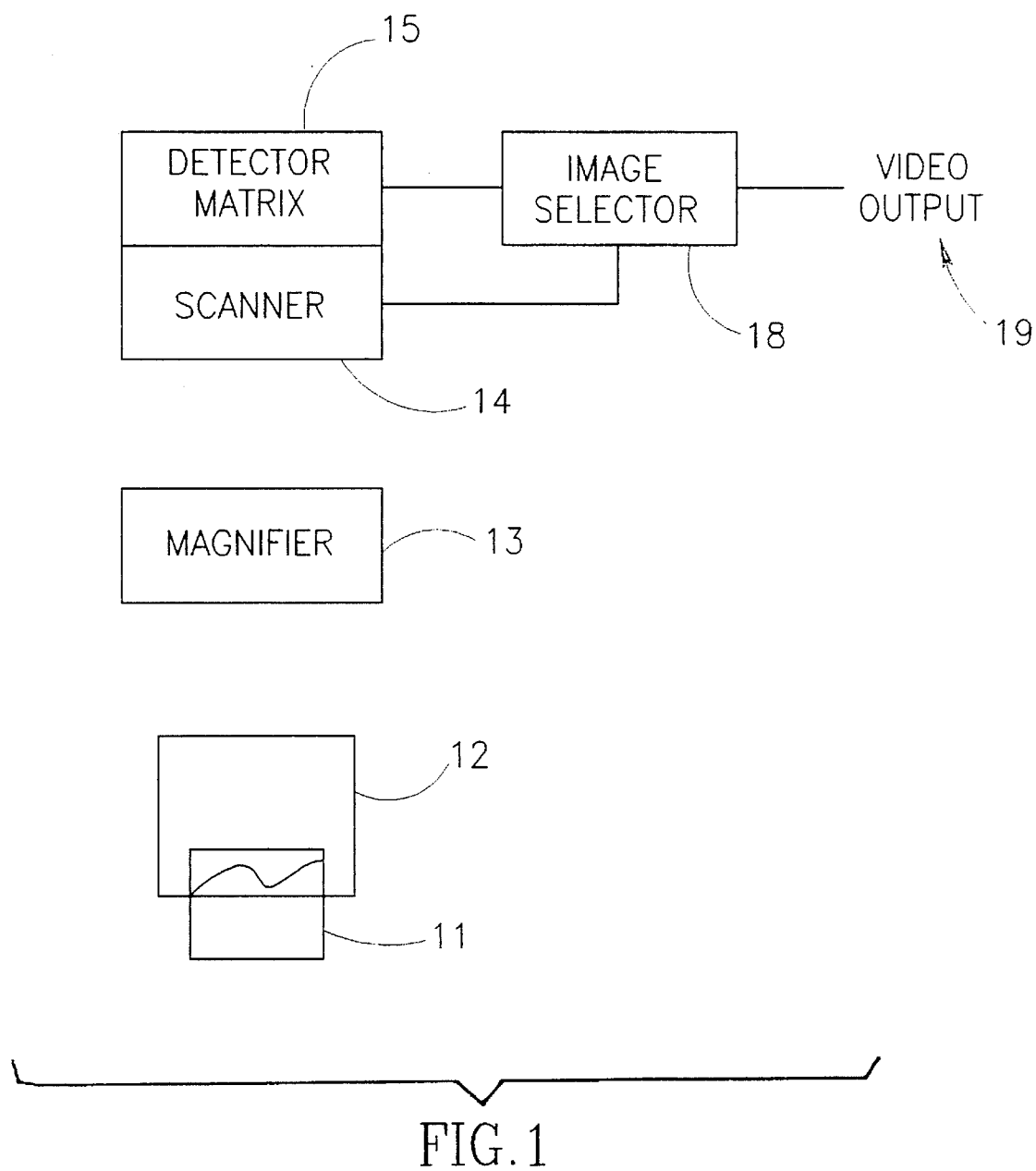
FIG. 1 is a block diagram of a system of the invention.

As shown in FIG. 1, a non-planar object 11 is confined in an observation volume 12. Above the object 11 there is located an optical imaging system, in this case a magnifier 13, which forms an image of the object, as illustrated in FIG. 5, above the magnifier 13 which is scanned, line by line, by means of scanner 14, which comprises a plurality of linear arrays of photodetectors 15, generally CCDs, shown in FIG. 5, the output of which is fed to image selector 18 and from same to video output 19.

Figure 2C:
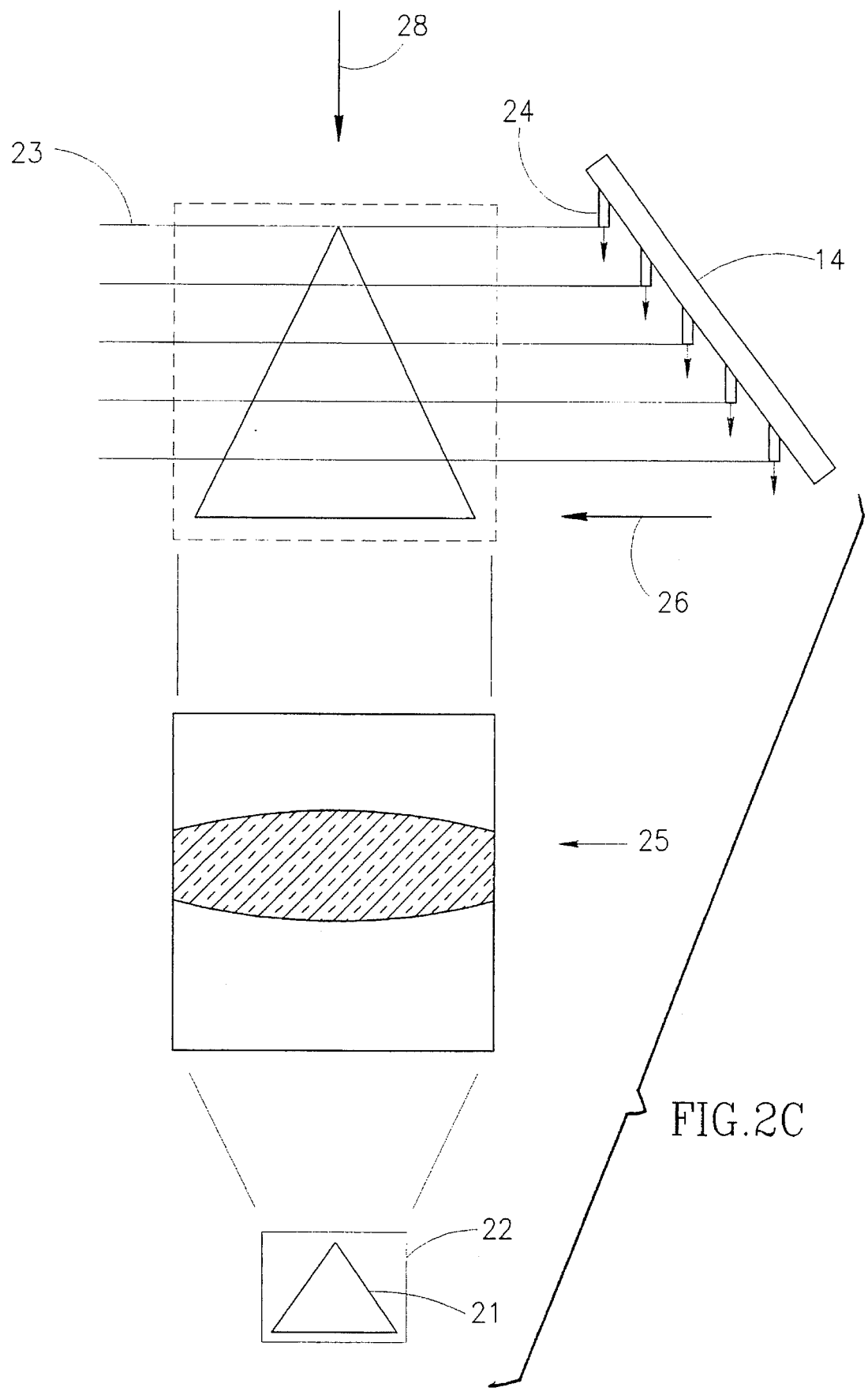
FIG. 2A is a side view and FIG. 2B is a front view, respectively, illustrating the principles of operation of the system of the invention, FIG. 2C being a view similar to FIG. 2A but in diagram form.
Figure 5:
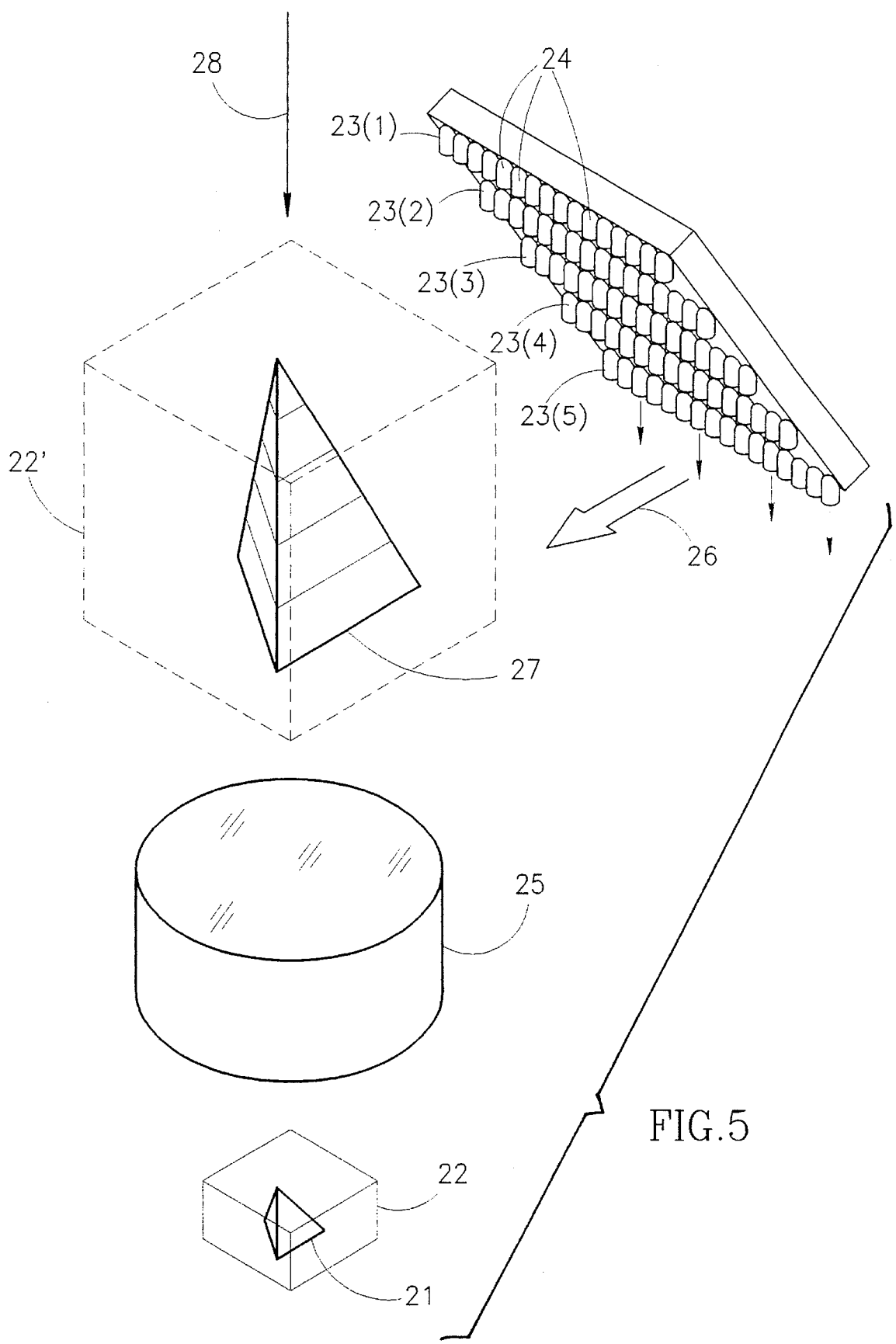
FIG. 5 is a perspective view illustrating the main features of the system of the invention.
Figure 6:
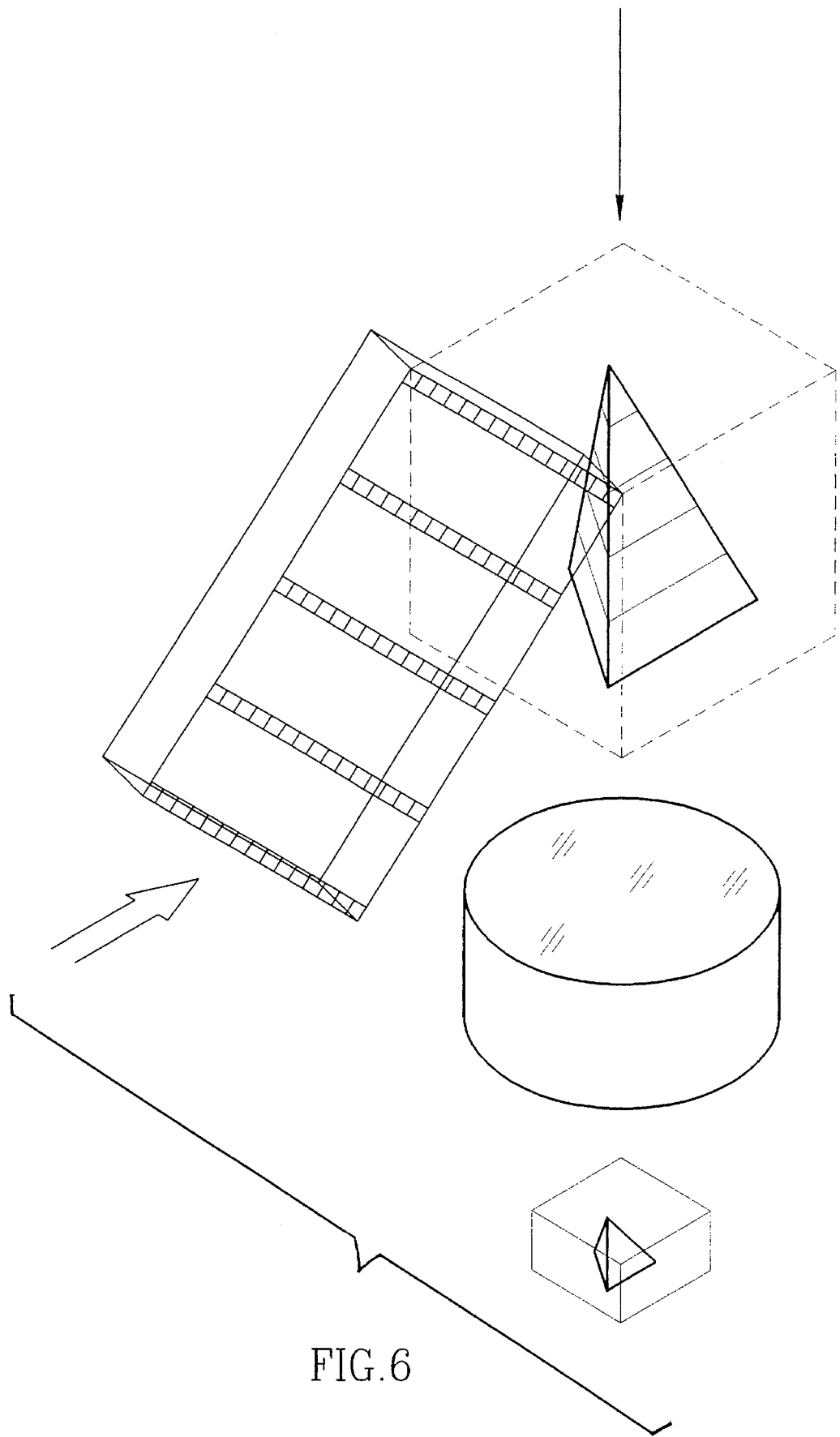
FIG. 6 is an illustration of an embodiment of the invention, illustrating its mode of operation with respect to a defined object and imaging system.

Details of the scanning process are set out in FIG. 5, where the object 21 confirmed in volume 22, are scanned by the linear array 23 of a plurality of photosensitive elements 24, where the scan is such that levels L1 to L5 are scanned by the arrays 23 (1) to 23 (5). The object is located respective the optical element (lens) 25 so as to form an image of the object 27, which image is scanned, a plurality of times, each scan covering a narrow rectangular element, at different levels L1 to L5, as shown in FIG. 2A and FIG. 2B, and also in FIG. 2C. Actually a considerably larger number of sub-images will be created. Each linear array contains a large number of photosensitive elements 24, so as to form an accurate image of those subelements of the given level, which are in focus. The image of such a "slice" is compared by the image selector 18, taking into account that when one array is used to sweep the entire surface, there exists a certain time lag between the adjacent levels. The elements 24 are arranged to point downwardly, parallel to the optical axis 28. The arrays 23 are arranged on a support which is at an angle to the optical axis as shown in FIGS. 2A, 5 and 6 so as to better cover the surface, the direction of sight being as indicated by arrow 28 in FIG. 5. The scan in direction 26 is effected so as to cover all the facets of the object 21. A high resolution is attained by the optical element, which may provide a desired magnification of the object, and whose numerical aperture is chosen according to the dimensions of the object 21, and according to the required resolution.

This image, above the lens system, is scanned by the array of electro-sensitive elements. Advantageously such an array comprises a large number of CCD detectors, and either one such linear array is used, moving respective the object from one level to the next one, or there are used simultaneously or consecutively, a number of such arrays. Video information is generated by each scan of a narrow rectangular slice ("line"), and at each line the image is shifted in time, one line after the other. The images resulting from the different scans differ from each other in that each such line contains only a part of the image (continuous or not, according to the shape of the object), is in focus, which is in focus at the given level; so that when the scan of the entire surface has been completed, there is obtained a number of video images, each of which is partially in focus, while in the other images, the same areas will be out of focus.

The thus obtained images are fed to an image selector 18, which serves to compare the image lines as they are received as video information, from each matrix line (taking into consideration the time lag between scans of adjacent lines), and which selects portions of the image which either are in focus, rejecting other parts of the video image for the same object line highest video frequency, and selects also the image closest to an intensity extreme, either black or white. The information is properly weighted, indicating the parts of each matrix line which is in focus for the given object (level) line.

Matrix Construction

The matrix construction is determined by taking into consideration the following considerations:

The proposed dimensions of the object on the X,Y plane,

The variations of the object dimensions along the Z axis in the observed area.

These constraints define the "Observation Volume", which is translated by the magnifier and the scanner into a virtual observation volume whose dimensions may be magnified a number of times respective the original Object Volume. This virtual observation volume is swept by the detector Matrix.

The required angular resolution determines the Numerical Aperture of the magnifier (and also the wavelength), This, in turn, determines the focal depth ZZd for the required resolution.

$$N = \frac{Zo}{Zd}$$

where Zo is the vertical dimension of the observation volume and Zd is the length of the detector line is determined by the instantaneous width of the area to be observed and by the scan rate.

The horizontal spacing between the lines, should be as small as possible, determined by the physical dimensions of the detector line. This distance determines the delay between the scanning of the same point on the object by two adjacent lines.

A decision on which of these two lines is better focused (or corresponding portions of these lines) cannot be made before then and thus the video generated by each line (except the last one) has to be stored until the next line's output is examined and a decision is made Selector The selector can be implemented by hardware, software or a combination of both and thus we will describe only its algorithm.

Figure 3:
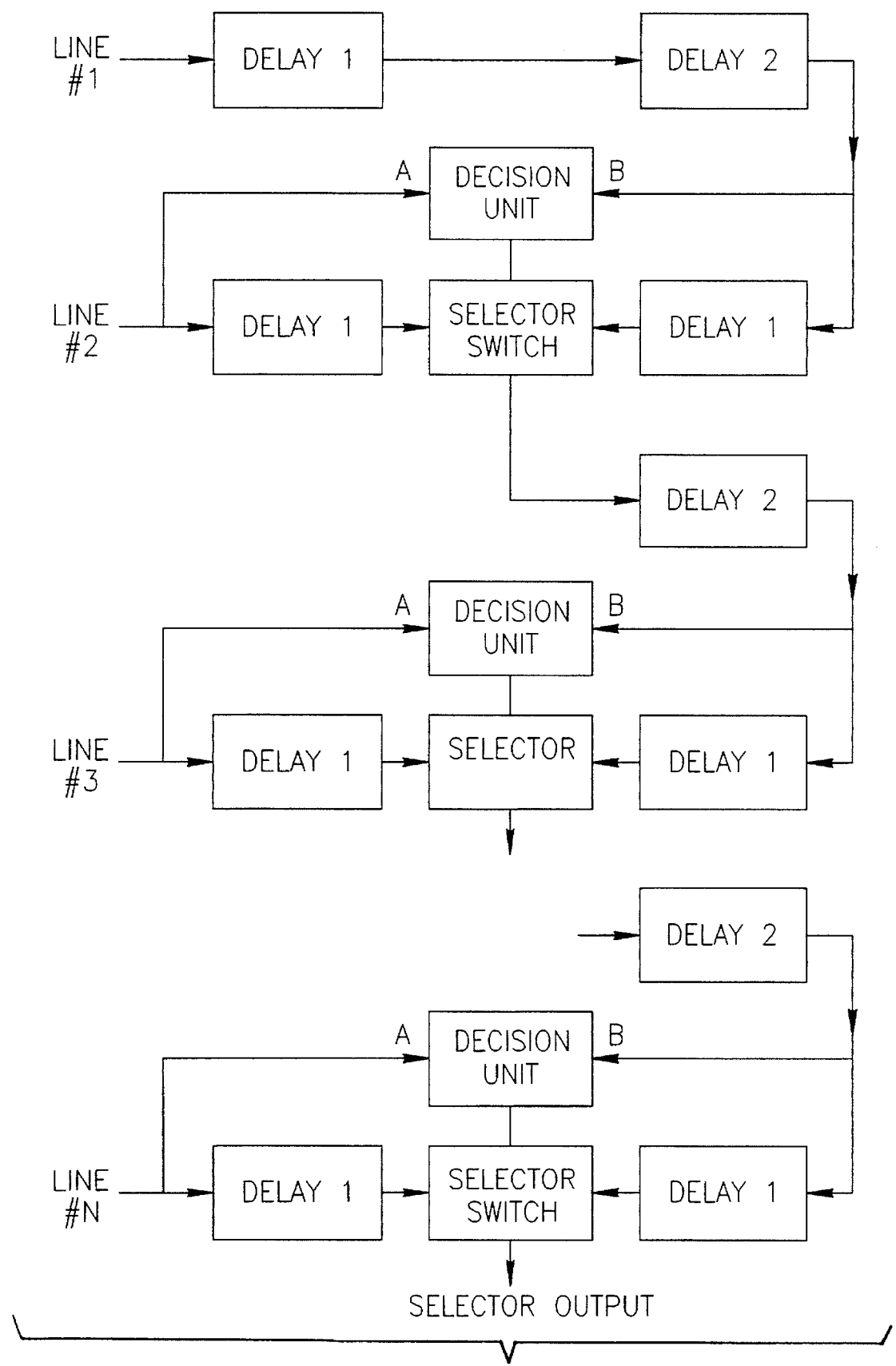
FIG. 3 is a block diagram illustrating the selector unit of the invention.

FIG. 3 describes the block diagram of the selector.

As data (in digital or video form arrives from the detector lines, each portion of this data is compared with the data generated by the previous line when it was scanning the same point on the object.

The data from the previous line is delayed by and amount of "Delay 1+Delay 2" which is equal to the total delay between two lines, The decision unit compares each portion of these two lines and commands the selector switch to select the output of the better focused line.

The data streams arriving at the selector switch are delayed by an amount of Delay 1, which is equal to the delay of the Decision Unit.

The output of the selector switch is delayed by an amount of Delay 2 before it is sent to the next Decision Unit and Selector Switch. The output of the list (N–1) Selector Switch is the output of the Selector.

Figure 4:
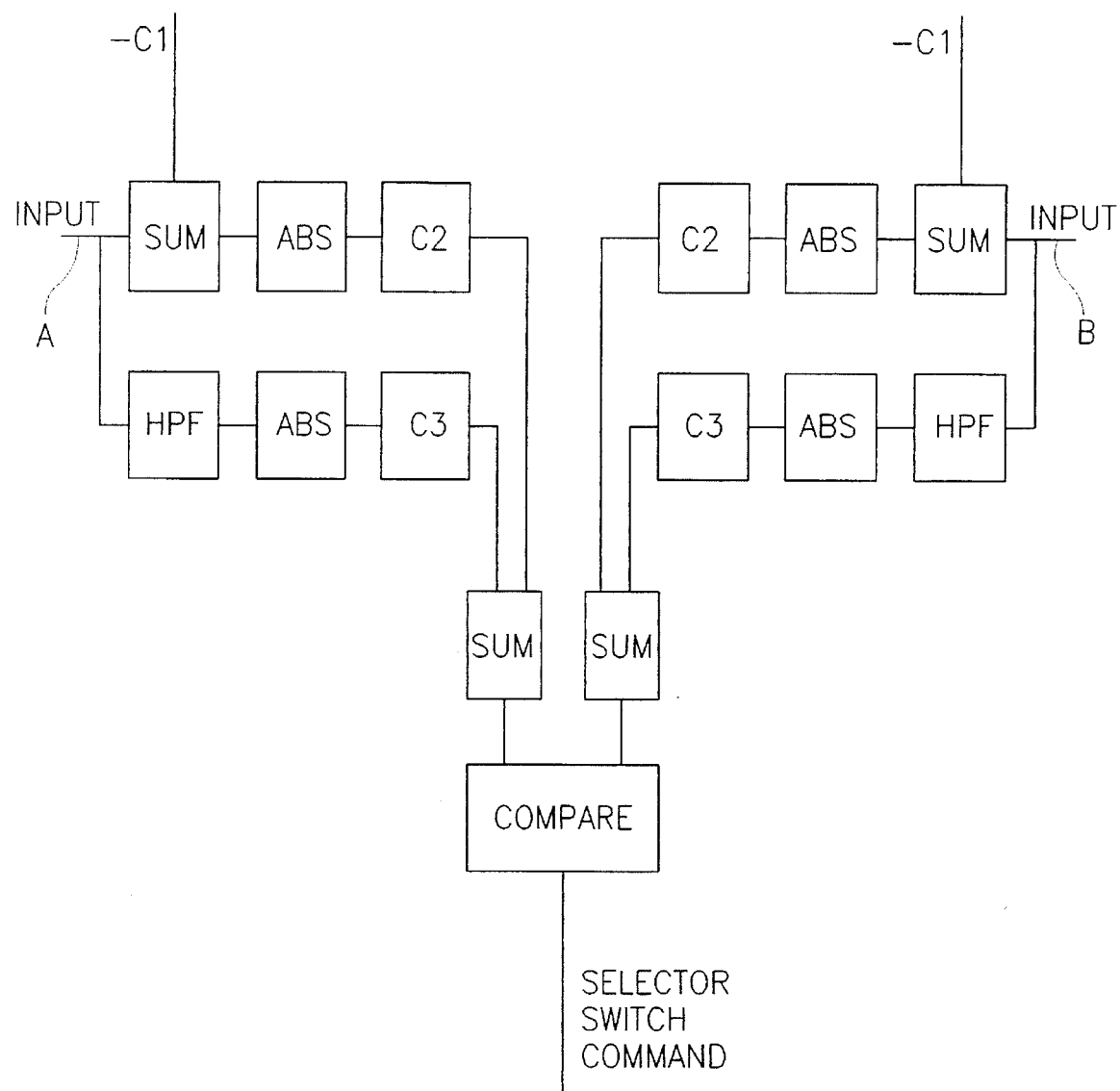
FIG. 4 is a block diagram of the decision unit of the invention.

FIG. 4 describes the operation of the Decision Unit.

The two signals come into the decision unit on the input lines A and B. Each line is processed in the following way (to measure the high frequency contents and the intensity):

- A constant of the value –C1 is added and the absolute value (ABS) of the signal is taken (The constant-C1 eliminates the D.C, component of the video signal).
- The signal is passed through a high pass filter and the absolute value is taken.
- These values are multiplied by the constants C2 and C3 respectively.
- The outputs of these multiplications are summed.
- The results of the two processed signals are compared and the higher value is selected.

If both lines give the same result, the switch will remain in it's prior position. This can happen for several reasons:

The object area is uniform

Both lines are out of focus

In both cases it is unimportant which of the lines is selected. The rate of position change for the selector switch is determined by the relative weights C2 and C3 and by the band width of the HPF.

A similar algorithm can be implemented where the line selection is based not only on the uni-dimensional focus quality, along the line as measured by the networks of the decision unit, but instead on a two-dimensional focus quality, where the corresponding pixels in each line, based on the previous positions, are also weighed by similar networks, and the highest resulting line is selected for this neighborhood.

EXAMPLE

Let us take an Observation Volume of (Xo,Yo, Zo) - 0.5×0.5×0.5 mm we want to observe objects which are enclosed within this volume with a resolution of 4 μm.

A. Determining N—the Number of Lines

This resolution dictates a numerical aperture (N.A.) of at least 0.2. The field depth (Zd) in these conditions will be about 10 μm. This means that to cover the entire vertical dimension (Zo) of the Observation Volume, we will have to utilize:

$$N = \frac{Zo}{Zd} = \frac{500}{10} = 50$$

$N = 50$ lines

B. Determining Magnification

The typical dimensions of a single picture element (Pixel) in available CCD arrays are about 10×10 μm.

This means that for the desired resolution we have to magnify the object by a ratio of M.

$$M = 1.5 \times \frac{10}{4} = 4$$

(A resolution element is 1.5 pixels).

C. Matrix Construction

The dimensions of the Image Volume will be $$Zo = 4^2 \times 0.5 = 8 \text{ mm}$$

$$Xo = 4 \times 0.5 \times 2 \text{ mm}$$

$$Yo = 4 \times 0.5 \times 2 \text{ mm}$$

The vertical spacing between two adjacent lines will be $$4_2 \times 10 = 160 \text{ μm}$$

The length of each line is, as mentioned, 2 mm, and divided by the pixel dimensions we get n, the number of pixels in each line $$n = \frac{2000}{10} = 200$$

Let us construct a detector matrix of N =50 lines (each consisting of 200 pixels) spaced by 320 μm.

This matrix will be tilted 30° (relative to the X,Y plane) and thus the vertical spacing of 160 μm is achieved.

D. Scanning Rate If the clock rate of the CCD is 20 MHz we will have clocked the entire 200 pixels of each line in to =10 μsec $$to = \frac{1}{20 \text{ (MHz)}} \times 200 = 10 \text{ μsec}$$

This means that each 10 μsec we can move the detector matrix one pixel along the image.

The full scan image of the matrix is determined by the length Xo of the Image Volume and by the projection of the detector matrix on the XY plane.

In our case this is $$2 + (320 \times 50 \times \cos 30°) = 15.9 \text{ mm}.$$

The number of steps is $$\frac{\text{Scan Range}}{\text{Pixel Dimension}} = \frac{15900}{10} = 1590$$

And the scan period is $$1590 \times 100 = 15900 \text{ μsec}$$

(A scan rate of approximately 63 Hz).

E. Processing

The output of each line is a continuous video signal in the range of 0–1 volt. The spectrum of this signal is (determined by the spatial texture and shape of the object and limited by the resolution of the CCD) limited by the clock rate of the CCD.

Let us use High Pass Filters in the Decision Unit with a cutoff frequency of 20 MHz and a 6dB per octave loss below this frequency. The delay of the Decision Units will be 0.4 μsec. The delays "Delay 1" and "Delay 2" will be such that:

"Delay 1"="Selector Delay"=0.4 μsec and

"Delay 1"+"Delay 2"="Line Time"=10 μsec

Thus

"Delay 2"=9.6 μsec

Let us choose C1=C2=C3=0.5

F. Point Target Imaging

Let us now consider a target which is a black point of minimal dimensions (E.G. a black ball of 4 μm diameter) which is suspended in the center of the Observation Volume against a white background.

Figure 7:
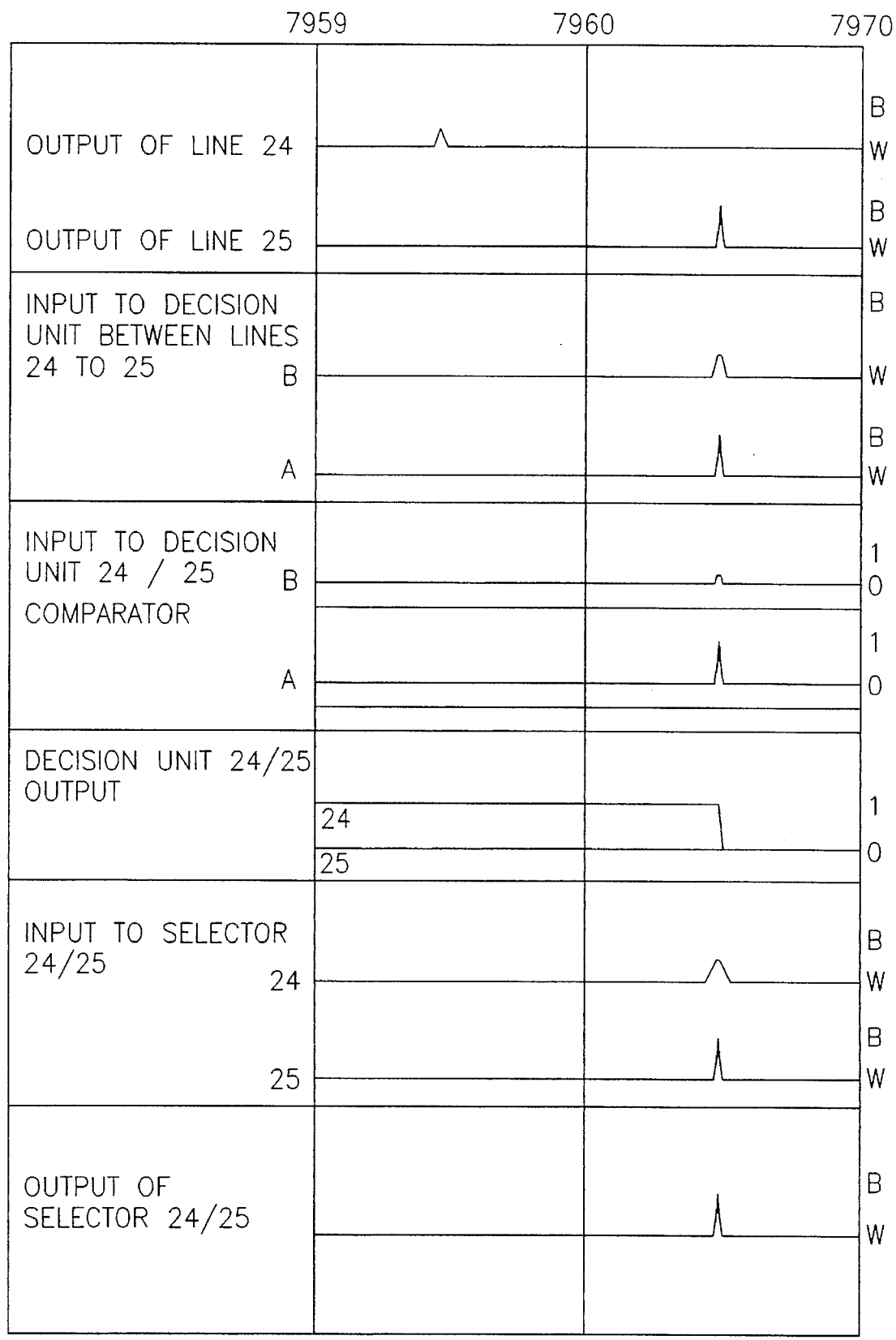
FIG. 7 is a diagram of signals versus time.

In FIG. 7 we can see the various stages of the signals coming out of lines 24 and 25 and being processed and selected by the selector described in FIGS. 3 and 4 (with the parameters defined in this example).

G. Video Lines

The outputs of the CCD lines 24 and 25 are shown for the time beginning at 7950 after the start of scan. (as we are interested in a single point at the center of the Observation Volume we look at the two lines in and just above the center, 24 and 25 and at the middle of the scan time). We see that line 23 "sees" the target at 7935 μsec but the target us fuzzy and weak, Line 25 sees a strong and well defined target at 7965 μsec.

H. Inputs to Decision Unit

The signals at the inputs of the Decision Unit 24/25 are:

At input A—the signal of line 25

At input B—the signal of line 24 but delayed by a 10 μsec.

I. Signals in Comparator Inputs

Both signals entering the Decision Units are processed similarly. Addition of −C1, the taking of the absolute value and multiplying it by C2, this just adds a D.C. component to the signal of a value of 0.25 V. (The impact on the image at the 7965 time is small), High-Pass filtration, taking an absolute value and multiplying it by C3 suppresses the signal coming in input 3 (from line 24) and leaves a strong signal coming from line 25 unaffected). Both signals at these inputs are slightly delayed.

J. Decision Unit Output

When the signals at the comparator inputs become markedly different (in our case just after 7965 μsec) the comparator changes its state and line 25 is selected.

K. Inputs to Selector Switch

The video signals arriving to the Selector Switch 24/25 are the same signals going to the Decision Unit 24/25, only delayed by Delay 1, which is equal to the Decision Unit delay.

By the time the point target signals arrive to these inputs, the comparator has already changed state and the signal from line 25 is selected and passed on to the next Decision Unit.

L. The Next Decision Unit

The same process will be repeated between line 25 and 26 only line 26 passes under the point target, and the signal will again be fuzzy and weak and therefore the signal out of the Selector Switch 25/26 will be the signal of line 25 (again, delayed by 10 μsec).

I claim:

1. A method for acquiring an image of a non-planar object which is in an object volume, and for processing the image to form a high resolution image, comprising:

forming an image of the object using an optical lens system having an optical axis pointing downwardly toward the object volume, said image being formed in an image volume above the optical lens system and focusing the non-planar object in the image volume;

providing a matrix above the optical lens system, the matrix comprising a plurality of spaced parallel linear arrays of photosensitive elements which each face downwardly parallel to the optical axis and toward the object, each array extending perpendicularly to the optical axis, the arrays being spaced from each other vertically in a direction parallel to the optical axis, and horizontally in a scan direction which is perpendicular to the optical axis and perpendicular to the extending direction of the arrays, so that the matrix is fitted and an entire height of the object in the object volume is in focus in the image volume for at least one of the photosensitive elements in at least one of the arrays, each photosensitive element producing a subimage;

scanning the non-planar object by moving the optical lens system and matrix together in the scan direction and over the non-planar object while maintaining a constant height of each array as the arrays move through the image volume so that, during each instant of the scanning, the object is in focus for different ones of the photosensitive elements at specific heights above the object and in the image volume for forming an altitude contour of the object comprising a plurality of the subimages of the photosensitive elements during a period when each subimage was in focus; and evaluating the subimages and integrating the subimages which were in focus during the scanning step to form a high resolution image of the non-planar object.

2. A method according to claim 1, including magnifying the non-planar image in the image volume using the optical lens system to form an enlarged high resolution image.

3. A method according to claim 1, including comparing the subimages of one of the parallel arrays to the subimages of an adjacent one of the parallel arrays to locate the subimage with better focus and selecting the subimage with better focus for evaluation and integration into the high resolution image.

4. An apparatus for acquiring an image of a non-planar object which is in an object volume, and for processing the image to form a high resolution image, comprising:

an optical lens system having an optical axis pointing downwardly toward the object volume, for creating an image of the object in an image volume above the optical lens system;

a matrix above the optical lens system, the matrix comprising a plurality of spaced parallel linear arrays of photosensitive elements which each face downwardly, parallel to the optical axis and toward the object, each array extending perpendicularly to the optical axis, the arrays being spaced from each other vertically in a direction parallel to the optical axis, and horizontally in a scan direction which is perpendicular to the optical axis and perpendicular to the extending direction of the arrays so the matrix is fitted, each photosensitive element being provided for forming a subimage so that an entire height of the object in the object space is in focus for at least one of the photosensitive elements in at least one of the arrays;

means for moving the optical lens system and matrix together in the scan direction across the entire non-planar object, with the matrix moving through the image volume while maintaining a constant height of each array in the image volume as each array moves in the scan direction, so that during each instant of movement in the scan direction, different portions of the non-planar object are in focus for different subimages of the photosensitive elements for forming an altitude contour of the object; and means for evaluating the subimages and integrating the subimages into a full high resolution image of the non-planar object, using the subimages which were in focus during the movement in the scan direction.

5. A system according to claim 4, wherein the optical lens system is structured to magnify the image of the object in the image volume over the size of the object in the object volume.

6. A system according to claim 4, wherein the means for evaluating and integrating the subimages including means for comparing the subimages from the photosensitive elements of adjacent arrays for selecting subimages which are in better focus.

7. A system according to claim 6, wherein said evaluating and integrating means includes delay means for delaying an evaluation and integration of subimages between adjacent arrays of photosensitive elements as the optical lens system and matrix move in the scan direction.

* * * * *